United States Patent [19]

Willis

[11] 4,280,535
[45] Jul. 28, 1981

[54] INNER TUBE ASSEMBLY FOR DUAL CONDUIT DRILL PIPE

[75] Inventor: Clyde A. Willis, Wichita Falls, Tex.

[73] Assignee: Walker-Neer Mfg. Co., Inc., Wichita Falls, Tex.

[21] Appl. No.: 79,228

[22] Filed: Sep. 26, 1979

Related U.S. Application Data

[63] Continuation of Ser. No. 872,335, Jan. 25, 1978, abandoned.

[51] Int. Cl.³ .............................................. F16L 9/18
[52] U.S. Cl. .................................. 138/112; 138/113; 138/114; 175/320
[58] Field of Search ............... 175/320, 215; 166/242, 166/241; 308/4 A; 138/113, 114, 112, 109, 148, DIG. 1

[56] References Cited

U.S. PATENT DOCUMENTS

| | | | |
|---|---|---|---|
| 3,268,274 | 8/1966 | Ortloff et al. | 308/4 A |
| 3,786,878 | 1/1974 | Chapman | 175/320 |
| 3,820,611 | 6/1974 | King | 308/4 A |

Primary Examiner—Lenard A. Footland
Attorney, Agent, or Firm—Hume, Clement, Brinks, Willian & Olds, Ltd.

[57] ABSTRACT

In a dual conduit drill pipe section having concentric inner and outer tubes, a plurality of centering lugs are provided which are disposed between the inner and outer tubes and include bearing surfaces which are adapted to reduce the friction and wear associated with the movement of the inner tube with respect to the outer tube. The inner tube is secured to the outer tube at one point along each pipe section by a heat meltable adhesive which bonds an anchor ring which is secured to the inner tube to a shoulder defined in the inner surface of the outer tube.

34 Claims, 6 Drawing Figures

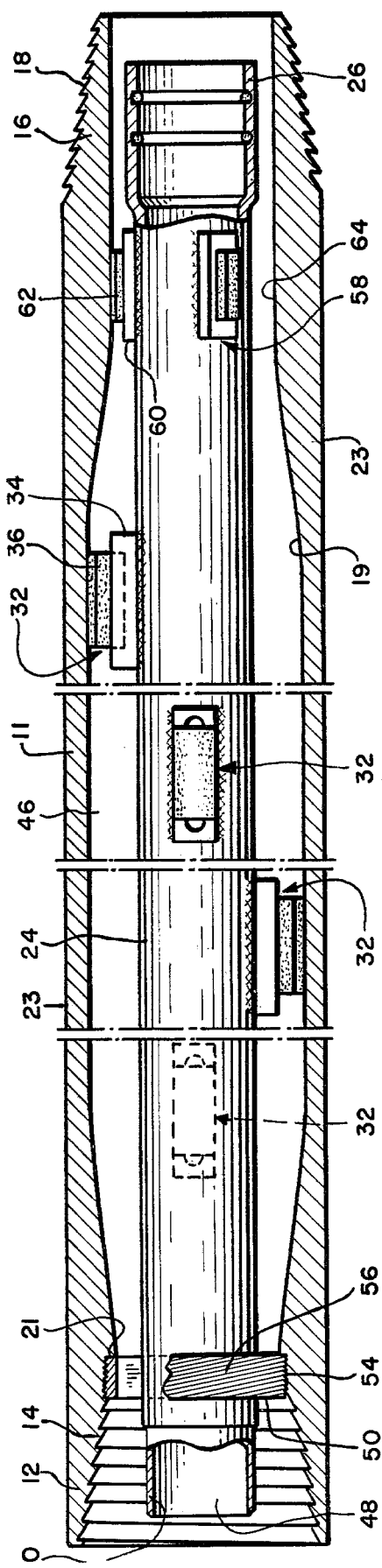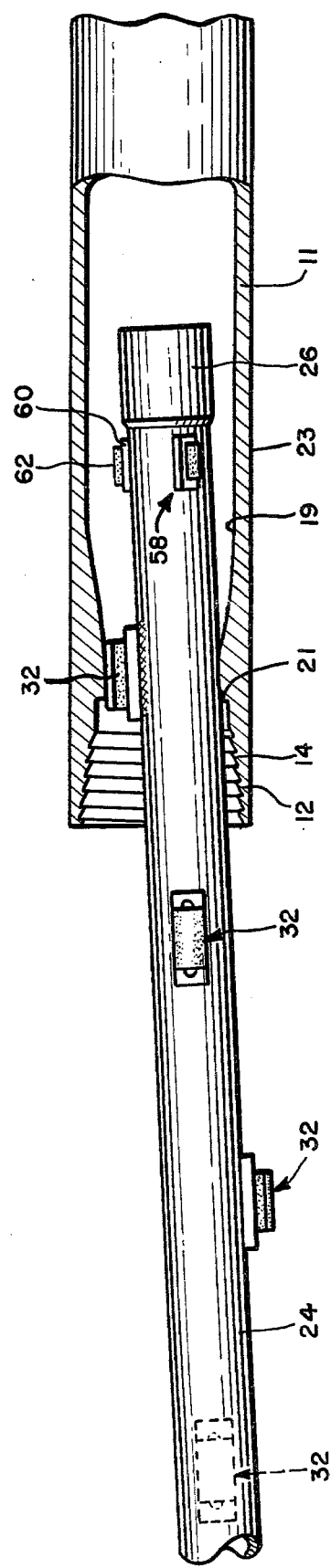

INNER TUBE ASSEMBLY FOR DUAL CONDUIT DRILL PIPE

This is a continuation of application Ser. No. 872,335, filed Jan. 25, 1978, abandoned.

BACKGROUND OF THE INVENTION

This invention concerns an improved nonrotating inner tube assembly for dual conduit drill pipe.

As described in Henderson U.S. Pat. No. 3,208,539, dual conduit drill pipe is suitable for use in a wide range of drilling operations. Such pipe includes an outer tube and a concentrically mounted inner tube which cooperate to define two passageways: a central passageway inside the inner tube which may be used to transport cuttings from the drill bit to the surface, and an annular passageway between the inner and outer tubes which may be used to transport drilling fluid from the surface to the drill bit.

In the Henderson dual conduit pipe, the inner tube is positioned inside the outer tube by a series of spacer ribs which are welded to the inner tube and frictionally secured in the outer tube in a light pressed fit. The inner tube is rigidly connected to the outer tube at one end only, as by spot welding the spacer ribs to the outer pipe.

Another means for securing the inner tube to the outer tube is disclosed in Ford U.S. Pat. No. 3,978,923. This assembly employs a spyder or lugs which are welded to the inner tube and rest on a shoulder formed in the outer tube. The spyder is held in place against the shoulder by a snap ring, and the inner tube is free to rotate within the outer tube. This assembly may be used in conjunction with steel lugs which are welded to the inner tube at several places along the length of the inner tube in order to centrally position the inner tube within the outer tube.

Both of these approaches to holding the inner tube within the outer tube suffer from certain disadvantages. In each case, the centering spacers bear against the outer tube, and friction between the spacers and the outer tube tends to rotate the inner tube with the outer tube. However, the rate at which the inner tube tends to rotate varies with the height of the spacers. Given a constant rate of rotation of the outer tube, the inner tube will tend to rotate at differing rates along its length, corresponding to the differing heights of the individual spacers. This effect is particularly acute in crooked bore holes, because such holes cause the outer pipe to bend back and forth as it rotates in the hole. This causes first one centering spacer and then another to engage the inner surface of the outer tube. In some cases the outer tube has been severely worn because of friction with the centering spacers. In other cases, it is the centering spacers which have been worn by the outer tube. On occasion, inner tubes have been observed to break due to torque resulting from a differential between the rates of rotation imposed at two points along the length of the inner tube.

SUMMARY OF THE INVENTION

The present invention provides an inner tube assembly which is less subject to the wear and breakage associated with differential rotation of the inner tube. This assembly includes means for centering the length of the inner tube within the outer tube and for reducing the friction and wear associated with differential movement between the inner tube and the outer tubes. In one embodiment of the invention, the assembly further includes means for preventing rotation of the inner tube within the outer tube at one point in each section of drill pipe to further reduce the friction associated with differential rotation between the inner and outer tubes.

The general object of this invention is to provide a means for positioning an inner tube within an outer tube of dual conduit pipe which will greatly increase the working life of drill pipe components and will reduce wear and breakage attributable to rotational strains induced in the inner tube. Other objects of the invention will become apparent upon consideration of the following description, with reference to the appended drawings, in which:

FIG. 5 is a transverse sectional view of a section of dual conduit drill pipe including a second embodiment of the present invention; and FIG. 6 is a transverse sectional view of the drill pipe of FIG. 5 during assembly.

DESCRIPTION OF TWO PREFERRED EMBODIMENTS

Figure 1:
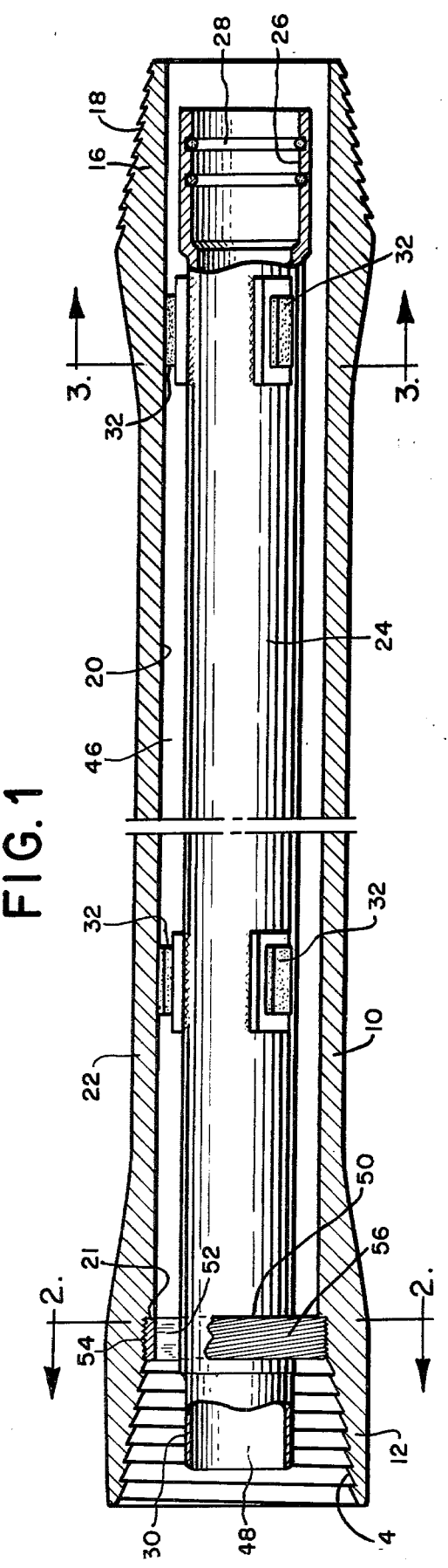
FIG. 1 is a transverse sectional view of a section of dual conduit drill pipe including a first embodiment of the present invention.

With reference to the drawings, there is shown in FIG. 1 a section of dual conduit drill pipe in partial cutaway. This section includes an outer tube 10 which defines a box tube joint 12 with internal threads 14 at one end and a pin tube joint 16 with external threads 18 at the other end. The outer tube has an inner surface 20 of substantially constant diameter which defines a shoulder 21 near the box tube joint 12. The outer surface 22 is not of constant diameter but instead is of greater diameter at the joints 12, 16 in order to provide the wall thickness needed for the threads 14,18.

The pipe section of FIG. 1 also includes an inner tube 24 having a first end which defines an O-ring box 26 with O-rings 28, and a second end 30. In use, drill pipe sections are assembled into a pipe string by threading the pin tube joint of one section of the outer tube into the box tube joint of a second section of outer tube. This operation causes the O-ring box of the inner tube in the first section to telescope over the pin end of the inner tube of the second section of outer tube. When assembled, the corresponding inner and outer tubes of the various sections are linked up to define isolated annular and central passageways, 46 and 48, respectively.

Figure 3:
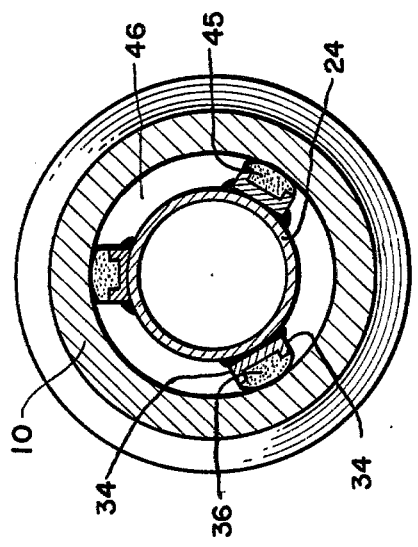
FIG. 3 is a cross-sectional view taken along line 3—3 of FIG. 1.
Figure 4:
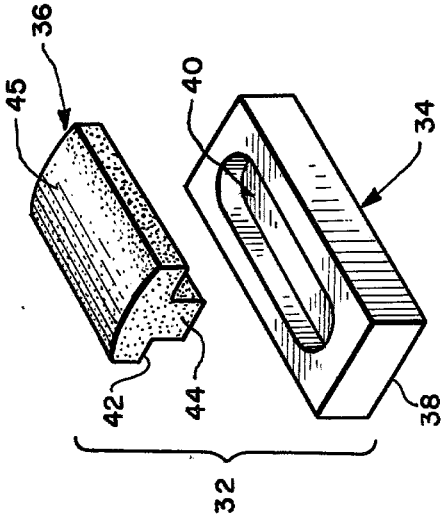
FIG. 4 is an exploded perspective view of a portion of FIG. 1.

The inner tube 24 is provided with several groups of centering spacers in the form of centering lugs 32. As best seen from FIG. 3, these centering lugs are arranged in groups of three along the length of the inner tube 24. Within each group, the three lugs 32 are symmetrically distributed about the inner tube 24. Each lug 32 is a two-part construction which includes a base 34 and a bearing cap 36. The base 34 is provided with a bottom surface 38 which is secured to the inner tube 24. In practice, it has been found that the base 34 may be conveniently made of steel and welded to the inner tube 24. A cavity 40 is defined by the base 34. The bearing cap 36 is shaped to be press fit into the base 34 and is provided with a shoulder 42 and an extending member 44 which extends into the cavity 40 when assembled. The bearing cap 36 also defines a bearing surface 45 which is shaped to slide across the inner surface 20 of the outer tube 10. Preferably, the bearing caps are fabricated of a synthetic bearing material, such as nylon impregnated with a lubricant such as molybdenum disulfide, and are reinforced with a flexible fiber such as fine brass wire, fiberglass, or carbon filaments so as to minimize the cold flow of the bearing material.

Figure 2:
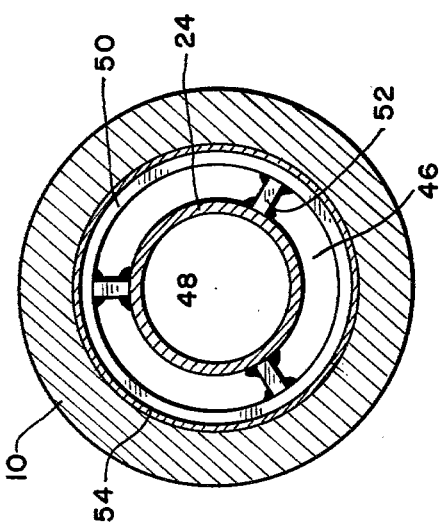
FIG. 2 is a cross-sectional view taken along 2—2 of FIG. 1.

The inner tube 24 is secured to the outer tube 10 by an anchor ring 50. This anchor ring 50 is attached to the inner tube 24 by spyder lugs 52, and is dimensioned to fit within the shoulder 21. As shown in FIG. 2, the spyder lugs 52 occupy a small part of the annular passageway 46. Preferably, the anchor ring 50 is held in place against the shoulder 21 by an adhesive 54 and the mating surfaces of the shoulder 21 and the ring 50 are provided with a scored, or phonograph, finish 56 to improve the adhesive bond. The adhesive 54 serves several purposes. First, it prevents the inner tube from rotating with respect to the outer tube at one point along the length of the inner tube. Second, the adhesive keeps out moisture and drilling fluids and thereby prevents rust which might otherwise make field disassembly and service impossible. Adhesive 54 is preferably a heat meltable adhesive, since welding, flame cutting and other heating equipment is commonly used in drilling operations and is often readily available for use in drill pipe assembly and disassembly.

The drill pipe section shown in FIG. 1 is assembled by sliding the O-ring box 26 into the box tube joint end 12 of the outer tube 10. Since the inner surface 20 is of substantially constant diameter, the centering lugs 32 slide into the outer tube 10 without obstruction. Assembly is completed by adhesively bonding the anchor ring 50 to the shoulder 21. The anchor ring 50 and the lugs 32 cooperate to reduce friction and stress associated with differential rotation of the inner tube within the outer tube. The anchor ring 50 ensures that, at one point in each pipe section, the inner tube is secured to the outer tube. The lugs 32 ensure that the rotational stresses on the inner tube are reduced by maintaining a low friction, sliding engagement with the outer tube. Accordingly, the torque exerted on the inner tube 24 by the outer tube 10 acting through the lugs 32 is reduced even though the outer tube diameter may be out of round and the height of individual lugs 32 may vary from one to the other. In this way frictional wear on the outer tube 10 and the lugs 32 is reduced, and rotational stress on the inner tube 24 is minimized.

FIGS. 5 and 6 depict a second embodiment of the invention intended for use with dual conduit drill pipe which employs an outer tube 11 having an inner surface 19 which does not have a substantially constant diameter. Such drill pipe is often used when an outer tube with a substantially constant outer diameter 23 is desired. The embodiment of FIGS. 5 and 6 is in many ways similar to the embodiment of FIGS. 1 through 4, and the same reference numerals are used to call out common elements. The following description emphasizes the differences between the two embodiments.

As mentioned above, the outer tube 11 of the second embodiment defines an inner surface 19 that varies in inside diameter, and the inside diameter is smaller at both ends of the tube 11 in order to accommodate the tube joints 12 and 16. The inner tube 24 is provided with O-ring box centering lugs 58 which center the O-ring box 26 in the restricted region 64 of the outer tube 11. These lugs 58 include a base 60 and a bearing cap 62 which are similar to the base 32 and bearing cap 36 of the lugs 36. However, the lugs 58 are smaller than the lugs 32 because of the restriction 64 and, therefore, the lugs 58 are also sized to fit past the shoulder 21.

In this embodiment the lugs 32 are not positioned in groups of four around the inner tube 24, but instead are arranged in a spiral pattern as shown in FIG. 5. This spiral pattern allows the lugs 32 to be pushed past the shoulder 21 one by one. The inner tube 24 is angled out of concentric alignment, as shown in FIG. 6, to allow each lug to pass across the shoulder 21 in succession.

Conventional engineering principles are used to determine the spacing and size of the centering lugs 32. When the lugs are arranged in radial sets as in the first embodiment of the invention, the spacing between adjacent sets of lugs varies with the stiffness of the pipe, the length of individual sections of pipe, and the maximum bending which will be encountered in drilling. The separation between adjacent sets of lugs should be small enough that the inner tube is prevented from coming into contact with the outer tube during normal drilling operations. When centering lugs are arranged in a spiral pattern as in the second embodiment, the lower limit to lug separation is provided by the stiffness of the inner tube, which must be bent in order to slip the individual centering lugs past the shoulder 21. A lug separation along the length of the pipe of approximately twenty-four inches has been used advantageously in dual tube pipe with an outer tube having an outer diameter of four and one-half inches. In each case, the height of the lugs 32, 58 is chosen to center the inner tube in the outer tube. The surface area of the bearing caps 36 is chosen in the conventional manner to provide adequate bearing life in view of the forces which will be applied to the caps and the yield point of the particular bearing material chosen.

It should be understood that various changes and modifications to the preferred embodiments described herein will be apparent to those skilled in the art. For example, bearing cap materials such as teflon may be preferable to the nylon described above in some applications. Alternately, keyways or set screws can be used to rotationally secure the inner tube to the outer tube in some applications, or varying centering lug arrangements could be used. Such changes and modifications can be made without departing from the scope of the present invention, and it is, therefore, intended that such changes and modifications be covered by the following claims.

I claim:

1. In a dual conduit drill pipe section adapted for connection to a drill bit, said drill pipe section including an outer tube, an inner tube disposed within the outer tube, and means for securing the inner tube to the outer tube, the improvement comprising:

a plurality of base members secured to the inner tube in a spaced relationship;

a plurality of bearing members, each bearing member secured to one of the plurality of base members and disposed between the inner tube and the outer tube, each bearing member defining a bearing surface having a hardness less than that of the outer tube and is positioned to contact the outer tube to provide low friction contact between the inner and outer tubes and thereby to reduce the friction associated with the movement of the inner tube with respect to the outer tube.

2. The improvement of claim 1 wherein the plurality of base members comprises a plurality of centering lugs secured to the inner tube, each lug defining a recess.

3. The improvement of claim 2 wherein each of the plurality of bearing members defines a projection sized to fit within the recess of the respective centering lug.

4. The improvement of claim 3 wherein each of the plurality of bearing members is press fit into the recess of the respective centering lug.

5. The improvement of claim 1 wherein the plurality of base members are arranged in a series of opposed sets along the length of the inner tube.

6. The improvement of claim 1 wherein the plurality of base members are arranged in a helical pattern along the length of the inner tube.

7. In a drill pipe string including a drill pipe section and a drill bit, said drill pipe section including an outer tube, an inner tube disposed within the outer tube, and means for securing the inner tube to the outer tube, the improvement comprising:
a plurality of centering lugs secured to the outside of the inner tube in a spaced relationship, each of said centering lugs defining a recess;
a plurality of bearing members, each bearing member defining a projection placed within the recess of a respective centering lug, each of said bearing members defining a bearing surface having a hardness less than that of the outer tube and positioned to contact the outer tube to provide low friction contact between the inner and outer tubes and thereby to reduce friction associated with the movement of the inner tube with respect to the outer tube.

8. The improvement of claim 7 wherein each of the plurality of bearing members is press fit within the recess of the respective centering lug.

9. The improvement of claim 7 wherein the plurality of centering lugs are arranged in a series of opposed sets along the length of the inner tube.

10. The improvement of claim 7 wherein the plurality of centering lugs are arranged in a helical pattern along the length of the inner tube.

11. A dual conduit drill pipe comprising:
an outer tube having an inner surface;
a shoulder defined in the inner surface;
an inner tube disposed within the outer tube;
an anchor ring mounted on the inner tube sized to fit within the shoulder;
a heat meltable adhesive disposed between the shoulder and the anchor ring to secure the inner tube to the outer tube; and
a plurality of centering lugs disposed between the inner and outer tubes, each of said plurality of lugs secured to the inner tube and provided with a bearing surface adapted to reduce friction and wear associated with the movement of the centering lugs with respect to the outer tube.

12. The drill pipe of claim 11 wherein the plurality of centering lugs are arranged on the inner tube in a substantially helical pattern.

13. The drill pipe of claim 11 wherein the plurality of centering lugs are arranged along the length of the inner tube in a series of opposed sets.

14. In a dual conduit drill pipe segment adapted for connection to a drill bit, said drill pipe including an inner drill pipe tube, an outer drill pipe tube disposed within the outer tube, and means for securing the inner tube to the outer tube at one point in the drill pipe segment such that the inner and outer tubes are jointed to form a rotatable unit and differential rotation between the inner and outer tubes at said one point is prevented during normal drilling use of the pipe, the improvement comprising:
a plurality of centering elements disposed between the inner and outer tubes, each of said centering elements provided with a low friction bearing surface positioned to contact one of the inner and outer tubes to reduce friction associated with movement of the inner tube with respect to the outer tube, said plurality of centering elements operative to provide low friction contact between the inner and outer tubes, each of said bearing surfaces having a hardness less than that of said one of the inner and outer tubes.

15. The improvement of claim 14 wherein said plurality of centering elements comprises a plurality of centering lugs.

16. The improvement of claim 15 wherein at least one of the centering lugs is provided with a bearing surface formed of a synthetic bearing material.

17. The improvement of claim 15 wherein the plurality of centering lugs are fixedly mounted on the inner tube.

18. The improvement of claim 15 wherein the plurality of centering lugs are fixedly mounted on the inner tube in a substantially helical pattern.

19. The improvement of claim 15 wherein the plurality of centering lugs are fixedly mounted on the inner tube in a series of opposed sets spaced along the length of the inner tube.

20. In a drill pipe string including a dual conduit drill pipe section and a drill bit, said drill pipe section including an outer tube, an inner tube disposed within the outer tube, and means for securing the inner tube to the outer tube at one point in the drill pipe section so as to prevent rotation between the inner and outer tubes at that point during normal drilling use of the drill pipe section, the improvement comprising:
means for centering the inner tube within the outer tube, said centering means including a plurality of centering spacers disposed between the inner and outer tubes and secured to the inner tube, each of said spacers including a low friction bearing member positioned to contact the outer tube to reduce the friction and wear associated with differential movement between the inner and outer tubes, the hardness of each of the bearing members being less than that of the outer tube.

21. The improvement defined in claim 20 wherein the securing means comprises an adhesive.

22. The improvement defined in claim 21 wherein the adhesive is a heat meltable adhesive.

23. The improvement defined in claim 20 wherein the plurality of centering spacers are arranged on the inner tube in a substantially helical pattern.

24. The improvement defined in claim 20 wherein the plurality of centering spacers are arranged on the inner tube in a series of substantially opposed sets spaced along the inner tube.

25. In a drill string including a dual conduit drill pipe section and a drill bit, said drill pipe section including an outer tube, an inner tube disposed within the outer tube, and means for securing the inner tube to the outer tube, the improvement comprising:

a plurality of centering elements disposed between the inner tube and the outer tube, each of said centering elements provided with a low friction bearing surface positioned to contact one of the inner and outer tubes to reduce the friction associated with movement of the inner tube with respect to the outer tube, said plurality of centering elements operative to provide low friction contact between the inner and outer tubes, each of said bearing surfaces having a hardness less than that of said one of the inner and outer tubes.

26. The improvement of claim 25 wherein said plurality of centering elements comprises a plurality of centering lugs.

27. The improvement of claim 26 wherein at least one of the centering lugs is provided with a bearing surface formed of a synthetic bearing material.

28. The improvement of claim 26 wherein the plurality of centering lugs are fixedly mounted on the inner tube.

29. The improvement of claim 26 wherein the plurality of centering lugs are fixedly mounted on the inner tube in a substantially helical pattern.

30. The improvement of claim 26 wherein the plurality of centering lugs are fixedly mounted on the inner tube in a series of substantially opposed sets spaced along the inner tube.

31. In a dual conduit drill pipe segment adapted for connection to a drill bit, said drill pipe including an inner drill pipe tube, an outer drill pipe tube disposed within the outer tube, and means for securing the inner tube to the outer tube at one point in the drill pipe segment such that the inner and outer tubes are jointed to form a rotatable unit and differential rotation between the inner and outer tubes at said one point is prevented during normal drilling use of the pipe, the improvement comprising:

a plurality of centering elements disposed between the inner and outer tubes, each of said centering elements provided with a low friction polymeric bearing surface positioned to reduce friction associated with movement of the inner tube with respect to the outer tube, said plurality of centering elements operative to provide low friction contact between the inner and outer tubes.

32. The improvement of claim 31 wherein the bearing surface is formed of nylon impregnated with a lubricant.

33. In a drill string including a dual conduit drill pipe section and a drill bit, said drill pipe section including an outer tube, an inner tube disposed within the outer tube, and means for securing the inner tube to the outer tube, the improvement comprising:

a plurality of centering elements disposed between the inner tube and the outer tube, each of said centering elements provided with a low friction polymeric bearing surface positioned to reduce the friction associated with movement of the inner tube with respect to the outer tube, said plurality of centering elements operative to provide low friction contact between the inner and outer tubes.

34. The improvement of claim 33 wherein the bearing surface is formed of nylon impregnated with a lubricant.

* * * * *